United States Patent
Choi et al.

(10) Patent No.: US 11,162,035 B2
(45) Date of Patent: Nov. 2, 2021

(54) CATALYTIC UPGRADING OF HEAVY OIL WITH SUPERCRITICAL WATER

(71) Applicant: SAUDI ARABIAN OIL COMPANY, Dhahran (SA)

(72) Inventors: Ki-Hyouk Choi, Dhahran (SA); Faisal M. Almulla, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 16/774,736

(22) Filed: Jan. 28, 2020

(65) Prior Publication Data

US 2021/0230488 A1    Jul. 29, 2021

(51) Int. Cl.
*C10G 53/12* (2006.01)
*C10G 29/04* (2006.01)
(Continued)

(52) U.S. Cl.
CPC .............. *C10G 29/04* (2013.01); *B01J 3/008* (2013.01); *B01J 19/0013* (2013.01); *B01J 19/242* (2013.01); *C10G 9/34* (2013.01); *C10G 11/02* (2013.01); *C10G 55/06* (2013.01); *B01J 2219/0004* (2013.01); *B01J 2219/00087* (2013.01); *B01J 2219/00159* (2013.01);
(Continued)

(58) Field of Classification Search
CPC ...... C10G 19/00; C10G 19/02; C10G 19/073; C10G 53/12; C10G 29/04; C10G 2300/4012; C10G 2300/302; C10G 2300/4006; C10G 2300/308; C10G 2300/205; C10G 2300/1077; C10G 2300/107; C10G 2300/202
See application file for complete search history.

(56) References Cited

U.S. PATENT DOCUMENTS

| 3,983,028 A | 9/1976 | McCollum et al. |
| 4,818,370 A | 4/1989 | Gregoli et al. |

(Continued)

FOREIGN PATENT DOCUMENTS

JP    2000109850 A    4/2000

OTHER PUBLICATIONS

Ates et al., "The role of catalyst in supercritical water desulfurization", Applied Catalysis B: Environmental, 2014, pp. 144-155, Elsevier.

(Continued)

*Primary Examiner* — Michelle Stein
(74) *Attorney, Agent, or Firm* — Bracewell LLP; Constance Gall Rhebergen (57) ABSTRACT

Embodiments of the disclosure provide a method and system for upgrading heavy hydrocarbons. A heavy hydrocarbon feed and a non-saline water feed are introduced to a first stage reactor. The first stage reactor is operated under supercritical water conditions to produce an effluent stream. The effluent stream and a saline water feed are combined to produce a mixed stream, where the saline water feed includes an alkali or alkaline earth metal compound. The mixed stream is introduced to a second stage reactor. The second stage reactor is operated under supercritical water conditions to produce a product stream including upgrading hydrocarbons. The second stage reactor is operated at a temperature less than that of the first stage reactor.

17 Claims, 2 Drawing Sheets

(51) Int. Cl.
  *C10G 11/02* (2006.01)
  *C10G 9/34* (2006.01)
  *B01J 19/24* (2006.01)
  *B01J 19/00* (2006.01)
  *B01J 3/00* (2006.01)
  *C10G 55/06* (2006.01)

(52) U.S. Cl.
  CPC ............... *B01J 2219/00162* (2013.01); *C10G 2300/107* (2013.01); *C10G 2300/1077* (2013.01); *C10G 2300/202* (2013.01); *C10G 2300/205* (2013.01); *C10G 2300/302* (2013.01); *C10G 2300/308* (2013.01); *C10G 2300/4006* (2013.01); *C10G 2300/4012* (2013.01)

(56) References Cited

U.S. PATENT DOCUMENTS

| | | | |
|---|---|---|---|
| 6,264,844 B1 | 7/2001 | Modell et al. | |
| 7,767,076 B2 | 8/2010 | Hokari et al. | |
| 8,197,670 B2 | 6/2012 | Li et al. | |
| 8,546,625 B2 | 10/2013 | Peterson et al. | |
| 9,005,432 B2 | 4/2015 | Choi et al. | |
| 9,382,485 B2 | 7/2016 | Choi et al. | |
| 9,745,517 B2 | 8/2017 | Levie et al. | |
| 10,066,172 B2 | 9/2018 | Choi et al. | |
| 2006/0011511 A1* | 1/2006 | Hokari | F02C 3/20 208/106 |
| 2008/0099374 A1* | 5/2008 | He | B01J 3/008 208/177 |
| 2009/0152168 A1* | 6/2009 | Siskin | C10G 45/02 208/229 |
| 2009/0166261 A1 | 7/2009 | Li et al. | |
| 2010/0155298 A1* | 6/2010 | Raterman | C10G 29/06 208/97 |
| 2011/0315600 A1* | 12/2011 | Choi | C10G 31/08 208/85 |
| 2012/0061294 A1* | 3/2012 | Choi | C10G 47/32 208/97 |
| 2012/0181217 A1* | 7/2012 | Choi | C10G 55/04 208/99 |
| 2013/0206645 A1* | 8/2013 | Yarbro | C10G 53/14 208/106 |
| 2016/0312129 A1 | 10/2016 | Choi et al. | |
| 2017/0166821 A1* | 6/2017 | Choi | C10G 47/32 |
| 2018/0187093 A1 | 7/2018 | Choi et al. | |

OTHER PUBLICATIONS

Choi et al., "Facile ultra-deep desulfurization of gas oil through two-stage or-layer catalyst bed", Catalysis Today, 2003, pp. 277-286, Elsevier.

Kishita et al., "Hydrothermal Visbreaking of Bitumen in Supercritical Water with Alkali", Journal of the Japan Petroleum Institute, 2002, pp. 361-367.

Kishita et al., "Upgrading of Bitumen by Hydrothermal Visbreaking in Supercritical Water with Alkali", Journal of the Japan Petroleum Institute, 2003, pp. 215-221.

Kruse et al., "Hot compressed water as reaction medium and reactant Properties and synthesis reactions", Journal of Supercritical Fluids, 2007, pp. 362-380, Elsevier.

Manda et al., "Supercritical water gasification of timothy grass as an energy crop in the presence of alkali carbonate and hydroxide catalystst". Biomass and Bioenergy, 2016, pp. 378-387, Elsevier Ltd.

Prado et al., "Sub- and supercritical water hydrolysis of agricultural and food industry residues for the production of formentable sugars: A review", Food and Bioproducts Processing, 2016, pp. 95-123, Elsevier.

Vogelaar et al., "Applicability of supercritical water as a reaction meduim for desulfurisation and demetallisation of gasoil", Fuel Processing Technology, 1999, pp. 265-277, Elsevier Science.

Voisin et al., "Solubility of inorganic salts in sub- and supercritical hydrothermal environment: Application to SCWO processes". The Journal of Supercritical Fluids, 2017, pp. 18-31, Elsevier.

Yuan et al., "Solvation of hydrocarbon radicals in sub-CW and SCW: An ab initio MD study", The Journal of Supercritical Fluids, 2011, pp. 93-98, Elsevier.

PCT ISRWO dated Apr. 29, 2021, in the prosecution of International Application No. PCT/US2021/070087, 12 pages.

* cited by examiner

CATALYTIC UPGRADING OF HEAVY OIL WITH SUPERCRITICAL WATER

BACKGROUND

Field of the Disclosure

Embodiments of the disclosure generally relate to hydrocarbon processing. More specifically, embodiments of the disclosure relate to a method and system for processing heavy hydrocarbons using supercritical water and an alkali/alkaline earth catalyst.

Description of the Related Art

Supercritical water has been investigated as a reaction medium for hydrocarbon processing. Due to the unique properties of supercritical water such as its solubility against organic compounds, supercritical water has been studied intensively in the area of heavy oil upgrading where relatively large hydrocarbon molecules are cracked and rearranged to produce upgraded hydrocarbons of greater value. It is believed that heavy oil in the presence of supercritical water undergoes conventional radical-mediated reactions such as initiation, propagation, and termination reactions that are present in conventional thermal cracking processes such as coking and visbreaking.

Supercritical water is known to suppress inter-radical reactions by reducing the diffusivity of hydrocarbon radicals. In addition, supercritical water molecules reduce the activity of proximate hydrocarbon radicals by making a strong interaction with certain orbitals of the radicals. Such reduction of diffusivity and activity of hydrocarbon radicals results in suppressed coke formation and increased quantities of liquid hydrocarbon products, in comparison with conventional coking processes.

However, the reduced radical activity negatively affects the reaction rate, resulting in limited conversion of heavy hydrocarbon molecules. In particular, aromatic sulfur compounds (which are responsible to the sulfur content of crude oil and its fractions) such as benzothiophenes are relatively inert in supercritical water environments. Catalytic hydrodesulfurization is typically implemented to remove such sulfur compounds; however, certain sulfur compounds are refractory in such relatively mild conditions. The addition of heterogeneous catalysts was known to be effective to remove aromatic sulfur compounds. However, the harsh conditions of the supercritical water environment destabilize the heterogeneous catalyst making it less attractive for industrial applications.

Homogeneous catalysts, most of which include organometallic compounds or metallic salts, loses its homogeneity due to the catalyst converting into insoluble solids upon exposure to supercritical water. Homogeneous catalysts such as alkali/alkaline earth metal compounds readily dissolve in subcritical water, but not in supercritical water. It is known that such alkali/alkaline earth metal compounds, in supercritical water conditions, cause severe corrosion to the supercritical water reactor wall and plug process lines. Therefore, such homogeneous catalysts are typically avoided in supercritical water upgrading processes.

Due to strict regulations on the quality of fuels under tight refining margin conditions, it is desired to search for economic ways to upgrade less-valued heavy oil.

SUMMARY

Embodiments of the disclosure generally relate to hydrocarbon processing. More specifically, embodiments of the disclosure relate to a method and system for processing heavy hydrocarbons using supercritical water and an alkali/alkaline earth catalyst.

Embodiments of the disclosure provide a method for upgrading heavy hydrocarbons. The method includes the step of introducing a heavy hydrocarbon feed and a non-saline water feed to a first stage reactor. The heavy hydrocarbon feed includes the heavy hydrocarbons. The first stage reactor is operated at a pressure equal to or greater than 22.06 megapascals (MPa) and a temperature equal to or greater than 373.9 deg. C. to produce an effluent stream. The method includes the step of combining the effluent stream and a saline water feed to produce a mixed stream. The saline water feed includes an alkali or alkaline earth metal compound. The method includes the step of introducing the mixed stream to a second stage reactor. The second stage reactor is operated at a pressure equal to or greater than 22.06 MPa and a temperature less than that of the first stage reactor but equal to or greater than 373.9 deg. C. to produce a product stream. The product stream includes upgraded hydrocarbons.

In some embodiments, the heavy hydrocarbons include an atmospheric residue fraction, a vacuum residue fraction, and combinations thereof. In some embodiments, the non-saline water feed is substantially in the absence of the alkali or alkaline earth metal compound. In some embodiments, the heavy hydrocarbon feed and the non-saline water feed are introduced to the first stage reactor having a water-to-oil volume flow ratio ranging between 0.5 and 2 at standard ambient temperature and pressure (SATP). In some embodiments, the first stage reactor is operated at a pressure ranging between 27 MPa and 30 MPa. In some embodiments, the first stage reactor is operated at a temperature ranging between 425 deg. C. and 500 deg. C. In some embodiments, the method further includes the step of cooling the effluent stream to a temperature ranging between 380 deg. C. and 420 deg. C. In some embodiments, the second stage reactor is operated at a pressure ranging between 27 MPa and 30 MPa. In some embodiments, the second stage reactor is operated at a temperature ranging between 380 deg. C. and 420 deg. C. In some embodiments, the alkali or alkaline earth metal compound is included in the saline water feed at a concentration ranging between 500 wt. parts per million (wt. ppm) and 3,000 wt. ppm. In some embodiments, the second stage reactor is operated such that water has a density ranging between 150 kilograms per cubic meter ($kg/m^3$) and 250 $kg/m^3$. In some embodiments, the second stage reactor is operated such that the alkali or alkaline earth metal compound is included in water at a concentration ranging between 500 wt. ppm and 1,000 wt. ppm. In some embodiments, the method further includes the step of cooling the product stream to a temperature ranging between 50 deg. C. and 120 deg. C. In some embodiments, the method further includes the step of depressurizing the product stream to a pressure ranging between 0.05 MPa and 5 MPa. In some embodiments, the depressurizing step is conducted within 2 minutes (min) after components of the product stream egress the second stage reactor. In some embodiments, the method further includes the step of introducing the product stream to a separator to produce a gas product stream, a liquid product stream, and a spent water stream. The gas product stream includes gaseous hydrocarbons. The liquid product stream includes liquid hydrocarbons. In some embodiments, the spent water stream includes the alkali or alkaline earth metal compound.

Embodiments of the disclosure also provide a supercritical water system for upgrading heavy hydrocarbons. The supercritical water system includes a first pump, a first heat exchanger, a second pump, a second heat exchanger, a first stage reactor, a third pump, a third heat exchanger, a mixer, and a second stage reactor. The first pump is configured to pressurize a heavy hydrocarbon feed to a pressure ranging between 27 MPa and 30 MPa. The heavy hydrocarbon feed includes the heavy hydrocarbons. The first heat exchanger is configured to heat the heavy hydrocarbon feed to a temperature ranging between 90 deg. C. and 150 deg. C. The second pump is configured to pressurize a non-saline water feed to a pressure ranging between 27 MPa and 30 MPa. The second heat exchanger is configured to heat the non-saline water feed to a temperature ranging between 400 deg. C. and 550 deg. C. The first stage reactor is fluidly connected downstream of the first pump and the first heat exchanger and fluidly connected downstream of the second pump and the second heat exchanger. The first stage reactor is operated at a pressure ranging between 27 MPa and 30 MPa and a temperature ranging between 425 deg. C. and 500 deg. C. to produce an effluent stream. The third pump is pressurize a saline water feed to a pressure ranging between 27 MPa and 30 MPa. The saline water feed includes an alkali or alkaline earth metal compound. The third heat exchanger is configured to heat the saline water feed to a temperature ranging between 380 deg. C. and 420 deg. C. The mixer is fluidly connected downstream of the first stage reactor and fluidly connected downstream of the third pump and the third heat exchanger. The mixer is configured to combine the effluent stream and the saline water feed to produce a mixed stream. The second stage reactor is fluidly connected downstream of the first separator. The second stage reactor is operated at a pressure ranging between 27 MPa and 30 MPa and a temperature ranging between 380 deg. C. and 420 deg. C. to produce a product stream. The product stream includes upgraded hydrocarbons.

In some embodiments, the supercritical water system further includes a fourth heat exchanger and a pressure reducer. The fourth heat exchanger is fluidly connected downstream of the second stage reactor. The fourth heat exchanger is configured to cool the product stream to a temperature ranging between 50 deg. C. and about 120 deg. C. The pressure reducer is fluidly connected downstream of the second stage reactor. The pressure reducer is configured to depressurize the product stream to a pressure ranging between 0.05 MPa and 5 MPa.

In some embodiments, the supercritical water system further includes a separator. The separator is fluidly connected downstream of the second stage reactor. The separator is configured to separate the product stream into a gas product stream, a liquid product stream, and a spent water stream. The gas product stream includes gaseous hydrocarbons. The liquid product stream includes liquid hydrocarbons. The spend water stream includes the alkali or alkaline earth metal compound.

In some embodiments, the supercritical water system further includes a fifth heat exchanger. The fifth heat exchanger is fluidly connected downstream of the first stage reactor and fluidly connected upstream of the mixer. The fifth heat exchanger is configured to cool the effluent stream to a temperature ranging between 380 deg. C. and about 420 deg. C.

BRIEF DESCRIPTION OF THE DRAWINGS

So that the manner in which the previously-recited features, aspects, and advantages of the embodiments of this disclosure as well as others that will become apparent are attained and can be understood in detail, a more particular description of the disclosure briefly summarized previously may be had by reference to the embodiments that are illustrated in the drawings that form a part of this specification. However, it is to be noted that the appended drawings illustrate only certain embodiments of the disclosure and are not to be considered limiting of the disclosure's scope as the disclosure may admit to other equally effective embodiments.

In the accompanying FIGURES, similar components or features, or both, may have a similar reference label.

DETAILED DESCRIPTION

The disclosure refers to particular features, including process or method steps and systems. Those of skill in the art understand that the disclosure is not limited to or by the description of embodiments given in the specification. The subject matter of this disclosure is not restricted except only in the spirit of the specification and appended claims.

Those of skill in the art also understand that the terminology used for describing particular embodiments does not limit the scope or breadth of the embodiments of the disclosure. In interpreting the specification and appended claims, all terms should be interpreted in the broadest possible manner consistent with the context of each term. All technical and scientific terms used in the specification and appended claims have the same meaning as commonly understood by one of ordinary skill in the art to which this disclosure belongs unless defined otherwise.

Although the disclosure has been described with respect to certain features, it should be understood that the features and embodiments of the features can be combined with other features and embodiments of those features.

Although the disclosure has been described in detail, it should be understood that various changes, substitutions, and alternations can be made without departing from the principle and scope of the disclosure. Accordingly, the scope of the present disclosure should be determined by the following claims and their appropriate legal equivalents.

As used throughout the disclosure, the singular forms "a," "an," and "the" include plural references unless the context clearly indicates otherwise.

As used throughout the disclosure, the word "about" includes +/−5% of the cited magnitude. The word "substantially" includes +/−5% of the cited magnitude.

As used throughout the disclosure, the words "comprise," "has," "includes," and all other grammatical variations are each intended to have an open, non-limiting meaning that does not exclude additional elements, components or steps. Embodiments of the present disclosure may suitably "comprise," "consist," or "consist essentially of" the limiting features disclosed, and may be practiced in the absence of a limiting feature not disclosed. For example, it can be recognized by those skilled in the art that certain steps can be combined into a single step.

As used throughout the disclosure, the words "optional" or "optionally" means that the subsequently described event or circumstances can or may not occur. The description includes instances where the event or circumstance occurs and instances where it does not occur.

Where a range of values is provided in the specification or in the appended claims, it is understood that the interval encompasses each intervening value between the upper limit and the lower limit as well as the upper limit and the lower limit. The disclosure encompasses and bounds smaller ranges of the interval subject to any specific exclusion provided.

Where reference is made in the specification and appended claims to a method comprising two or more defined steps, the defined steps can be carried out in any order or simultaneously except where the context excludes that possibility.

As used throughout the disclosure, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present disclosure.

As used throughout the disclosure, spatial terms described the relative position of an object or a group of objects relative to another object or group of objects. The spatial relationships apply along vertical and horizontal axes. Orientation and relational words such are for descriptive convenience and are not limiting unless otherwise indicated.

As used throughout the disclosure, the term "atmospheric residue" refers to the fraction of oil-containing streams having an initial boiling point (IBP) of 340 deg. C., such that all of the hydrocarbons have boiling points greater than 340 deg. C. and includes the vacuum residue fraction. Atmospheric residue can refer to the composition of an entire stream, such as when the feedstock is from an atmospheric distillation unit, or can refer to a fraction of a stream, such as when a whole range crude is used.

As used throughout the disclosure, the term "vacuum residue" refers to the fraction of oil-containing streams having an IBP of 540 deg. C. Vacuum residue can include a fraction having a true boiling point (TBP) 10% equal to or greater than about 565 deg. C. Vacuum residue can refer to the composition of an entire stream, such as when the feedstock is from a vacuum distillation unit or can refer to a fraction of stream, such as when a whole range crude is used.

As used throughout the disclosure, the term "asphaltene" refers to the fraction of an oil-containing stream which is not soluble in a n-alkane, particularly, n-heptane.

As used throughout the disclosure, the terms "heavy hydrocarbon" and "heavy oil" refer to the fraction in the petroleum feed having a TBP 10% that is equal to or greater than about 340 deg. C., or alternately equal to or greater than about 540 deg. C. In at least one embodiment, the heavy fraction has a TBP 10% that is equal to or greater than about 540 deg. C. Examples of a heavy fraction can include the atmospheric residue fraction or vacuum residue fraction. The heavy fraction can include components from the petroleum feed that were not converted in an SCW reactor. The heavy fraction can also include hydrocarbons that were dimerized or oligomerized in the SCW reactor due to either lack of hydrogenation or resistance to thermal cracking.

As used throughout the disclosure, the term "coke" refers to a toluene insoluble material that is present in petroleum or is formed in a reactor.

As used throughout the disclosure, the term "cracking" refers to the breaking of hydrocarbons into smaller ones containing few carbon atoms due to the breaking of carbon-carbon bonds.

As used throughout the disclosure, the term "upgrade" means one or all of increasing API gravity, decreasing the amount of impurities, such as sulfur, nitrogen, and metals, decreasing the amount of asphaltenes, and increasing the amount of distillate in a process outlet stream relative to the process feed stream. One of skill in the art understands that upgrade can have a relative meaning such that a stream can be upgraded in comparison to another stream, but can still contain undesirable components such as impurities. Such upgrading results in increase of API gravity, shifting distillation curve to lower temperature, decrease of asphalthene content, decrease of viscosity, and increase of light fractions such as naphtha and diesel.

As used throughout the disclosure, the term "conversion reaction" refers to one or more reactions that can upgrade a hydrocarbon stream including cracking, isomerization, alkylation, dimerization, aromatization, cyclization, desulfurization, denitrogenation, deasphalting, and demetallization.

As used throughout the disclosure, the term "residence time" refers to a value equivalent to an internal volume of a certain reactor divided by the volumetric flow rate of a certain feedstock introduced to the reactor at operating conditions of the reactor.

It is known in the art that supercritical water has unique properties making it suitable for use as a petroleum reaction medium where the reaction objectives can include conversion reactions, desulfurization reactions, denitrogenation reactions, and demetallization reactions. Supercritical water is water at a temperature at or greater than the critical temperature of water and at a pressure at or greater than the critical pressure of water. The critical temperature of water is 373.946 deg. C. The critical pressure of water is 22.06 megapascals (MPa). Advantageously, at supercritical conditions water acts as both a hydrogen source and a solvent (diluent) in conversion reactions, desulfurization reactions and demetallization reactions and a catalyst is not needed. Hydrogen from the water molecules is transferred to the hydrocarbons through direct transfer or through indirect transfer, such as the water gas shift reaction.

Without being bound any theory, it is understood that the basic reaction mechanism of supercritical water mediated petroleum processes is similar to a free radical reaction mechanism. Radical reactions include initiation, propagation, and termination steps. With hydrocarbons, initiation is the most difficult step. Initiation requires the breaking of chemical bonds. The bond energy of carbon-carbon bonds (C—C) is about 350 kilojoules per mole (kJ/mol), while the bond energy of carbon-hydrogen bonds (C—H) is about 420 kJ/mol, both of which are considered high chemical bond energies. Due to the high chemical bond energies, carbon-carbon bonds and carbon-hydrogen bonds do not break easily at the temperatures in a supercritical water process, 380 deg. C. to 450 deg. C., without catalyst or radical initiators.

Thermal energy creates radicals through chemical bond breakage. Supercritical water creates a "cage effect" by surrounding the radicals. The radicals surrounded by water molecules cannot react easily with each other, and thus, intermolecular reactions that contribute to coke or char formation are suppressed. The cage effect suppresses coke or char formation by limiting inter-radical reactions. Supercritical water, having low dielectric constant, dissolves hydrocarbons and surrounds radicals to prevent the inter-radical reaction, which is the termination reaction resulting in condensation (dimerization or polymerization). Because of the barrier set by the supercritical water cage, hydrocarbon radical transfer is more difficult in supercritical water as compared to conventional thermal cracking processes, such as delayed coker, where radicals travel freely without such barriers.

Without being bound by any theory, alkali/alkaline earth metal compounds such as sodium chloride can enhance the upgrading of heavy oil under supercritical water conditions. For example, alkali/alkaline earth metal compounds can capture sulfur compounds present in heavy oil. Sodium readily reacts with sulfur to form sodium sulfide, which prevents the recombination of sulfur with proximate hydrocarbons.

In addition, alkali/alkaline earth metal compounds can increase the ionic nature of supercritical water. Supercritical water has a low dielectric constant (about 6 at the critical point) and a high $pK_w$ value (about 18 at 450 deg. C. and 25 MPa), which are similar traits of organic solvents at normal conditions. Such unique properties of supercritical water allow organic compounds to be miscible in supercritical water while suppressing ionic reactions. On the other hand, water in the liquid phase has a lesser $pK_w$ value of about 14 at SATP, which allows ionic reactions to readily occur in such subcritical water environment. By introducing an ionic compound in supercritical water, the dielectric constant of supercritical water increases while the $pK_w$ value decreases, allowing ionic reactions to occur, to a certain degree, even in a supercritical water environment. It is known that alkali/alkaline earth metal compounds have a low but non-zero solubility in supercritical water. Such solubility is dependent on the density of supercritical water, which is in turn related to the dielectric constant of supercritical water.

Embodiments of the disclosure provide a process and system for upgrading heavy hydrocarbons in the presence of an alkali/alkaline earth metal compound under supercritical water conditions. In the first step, a non-saline water feed and a heavy hydrocarbon feed are introduced to a first stage reactor operated under supercritical conditions of water such that conversion reactions undergo to upgrade the heavy hydrocarbons to a certain degree. The effluent of the first stage reactor is combined with an aqueous solution of alkali/alkaline earth metal compounds serving as a catalyst. In the second step, the mixture is introduced to a second stage reactor also operated under supercritical conditions of water such that conversion reactions and desulfurization reactions take place. The presence of the alkali/alkaline earth metal compounds facilitates supercritical water-mediated hydrolysis resulting in enhanced desulfurization. The second stage reactor is operated at a temperature less than the first stage reactor but still greater than the critical temperature of water. Both the first stage reactor and the second stage reactor are operated at a pressure greater than the critical pressure of water.

In heavy oil upgrading under supercritical water conditions, alkali/alkaline earth metal compounds are typically avoided due to their precipitative and corrosive behavior against supercritical water reactors and their peripheral tubing. For example, a typical supercritical water-based heavy oil upgrading process involves using ultraclean water (for example, an ASTM Type I compliant water) having a conductivity less than about 0.056 microSiemens per centimeter (0/cm) and a sodium content less than about 1 micrograms per liter (μg/L).

Nonetheless, such alkali/alkaline earth metal compounds are effective sources for upgrading heavy oil which increases the ionic nature of supercritical water. To achieve this end, the alkali/alkaline earth metal compounds are provided to a suitable oil-supercritical water matrix. For example, heavy hydrocarbon molecules, such as asphaltenes that include polyaromatic hydrocarbons, are not readily miscible in supercritical water and would seldom be affected by the presence of the alkali/alkaline earth metal compounds. Certain degree of cracking of these heavy hydrocarbon molecules are therefore necessary to increase the miscibility of the oil in supercritical water conditions, which is conducted in the first stage reactor in the absence of the alkali/alkaline earth metal compounds.

In the second stage reactor, excess quantities of alkali/alkaline earth metal compounds in oil-supercritical water matrices may lead to precipitation and ultimately coking. The precipitation can be mitigated by controlling the quantities of the alkali/alkaline earth metal compound to have a concentration less than the solubility limit at operation conditions of the second stage reactor. For example, the concentration of the alkali/alkaline earth metal compound is about 100 wt. ppm to about 1,000 wt. ppm less than the solubility limit at the operating conditions of the second stage reactor. In addition, the precipitation can be mitigated by setting the superficial velocity of the fluids in the second stage reactor and the output tubing to a relatively large value such that any produced solids are removed from the second stage reactor. For example, the second stage reactor can have a Reynolds number greater than about 3,000 or alternately greater than about 5,000. Also, the second stage reactor can be a tubular type reactor (typically in a coiled form) having a relatively large length-to-diameter aspect ratio.

In heavy oil upgrading, hydrolysis reactions typically require an acid or base catalyst for meaningful conversion. Hydrocarbons including heteroatoms (that is, atoms other than carbon and hydrogen) are more active in hydrolysis reactions than pure hydrocarbons due to the carbon-heteroatom bonds being more polar than that of carbon-carbon and carbon-hydrogen bonds. The presence of alkali/alkaline earth metal compounds accelerates such hydrolysis reactions of thermally cracked, relatively unstable hydrocarbons resulting in greater desulfurization. Because the ionic product of liquid phase water reaches its maximum at about 300 deg. C., which is about three orders of magnitude greater than that of ambient liquid water, such near-critical water can be used as a reaction medium for certain acid- or base-catalyzed reactions. However, near-critical water conditions may lead to unwanted phase separation, which can occur in heavy fractions such as asphaltenes. Near-critical water conditions are avoided by cooling or depressurizing, or both, the effluent exiting the second stage reactor to about sub-boiling temperature and about ambient pressure, respectively.

In some embodiments, heavy hydrocarbons are introduced to the process. The heavy hydrocarbons can be obtained from any heavy oil source derived from petroleum, coal liquid, or biomaterials. Non-limiting examples of heavy hydrocarbons can include whole range crude oil, distilled crude oil, residue oil, atmospheric residue, vacuum residue, vacuum gas oil, deasphalted oil, topped crude oil, refinery streams, product streams from steam cracking processes, liquefied coals, liquid products recovered from oil or tar sands, bitumen, oil shale, asphaltene, liquid hydrocarbons recovered from gas-to-liquid (GTL) processes, and biomass derived hydrocarbons. In at least one embodiment, the heavy hydrocarbons can include an atmospheric residue, a vacuum residue, a vacuum gas oil, and a deasphalted oil. "Whole range crude oil" refers to passivated crude oil which has been processed by a gas-oil separation plant after being recovered from a production well. "Topped crude oil" can also be known as "reduced crude oil" and refers to a crude oil having no light fraction, and would include an atmospheric residue stream or a vacuum residue stream. "Refinery streams" can include "cracked oil," such as light cycle oil, heavy cycle oil, and streams from a fluid catalytic cracking unit (FCC), such as slurry oil or decant oil, a heavy stream from hydrocracker with a boiling point greater than 340 deg. C., a deasphalted oil (DAO) stream from a solvent extraction process, and a mixture of atmospheric residue and hydrocracker bottom fractions.

The heavy hydrocarbons can have a TBP 10% greater than about 540 deg. C., alternately greater than about 400 deg. C., or alternately greater than about 340 deg. C. In at least one embodiment, the heavy hydrocarbons have a TBP 10% of about 400 deg. C. The heavy hydrocarbons can include sulfur-containing hydrocarbons. The sulfur-containing hydrocarbons can include aliphatic sulfur compounds such as thiols, sulfides, and disulfides. The heavy hydrocarbons can have a total sulfur content greater than about 0.05 wt. %, alternately greater than about 0.1 wt. %, or alternately greater than about 0.2 wt. %. In at least one embodiment, the heavy hydrocarbons have a total sulfur content of about 3.95 wt. %. Greater than about 1%, alternately greater than about 5%, or alternately greater than about 10% of the sulfur-containing hydrocarbons are aliphatic sulfur compounds. The heavy hydrocarbons can have a salt content less than about 200 pounds per 1,000 barrels (pkb), equivalent to less than about 0.57 kg/m$^3$. In some embodiments, crude oil has a salt content ranging between about 5 pkb and about 20 pkb. The heavy hydrocarbons can have a nitrogen content of greater than about 100 wt. ppm, alternately greater than about 200 wt. ppm, or alternately greater than about 500 wt. ppm.

In some embodiments, a non-saline water is introduced to the process. The non-saline water can be a deionized water. The non-saline water can have a conductivity less than about 1.0 μS/cm, alternately less than about 0.5 μS/cm, or alternately less than about 0.1 μS/cm. In at least one embodiment, the non-saline water has a conductivity less than about 0.1 μS/cm. The non-saline water can have a sodium content less than about 10 μg/L, alternately less than about 5 μg/L, or alternately less than about 1 μg/L. In at least one embodiment, the non-saline water has a sodium content less than about 1 μg/L. The non-saline water can have a chloride content less than about 5 μg/L, alternately less than about 3 μg/L, or alternately less than about 1 μg/L. In at least one embodiment, the non-saline water has a chloride content less than about 1 μg/L. The non-saline water can have a silica content less than about 5 μg/L, alternately less than about 4 μg/L, or alternately less than about 3 μg/L. In at least one embodiment, the non-saline water has a silica content less than about 3 μg/L.

In some embodiments, a saline water is introduced to the process. The saline water can be a deionized water containing alkali or alkaline earth metal compounds. Non-limiting examples of alkali or alkaline earth metals include lithium, sodium, potassium, magnesium, and calcium. Non-limiting examples of anionic components of the alkali or alkaline earth metal compounds include chlorides, carbonates, hydroxides, phosphates, nitrates, and sulfates. In some embodiments, the alkali or alkaline earth metal compounds include sodium chloride, potassium chloride, sodium hydroxide, and potassium hydroxide. The salt content of the saline water can range between about 100 wt. ppm and about 6,000 wt. ppm or alternately between about 500 wt. ppm and about 3,000 wt. ppm.

Figure 1:
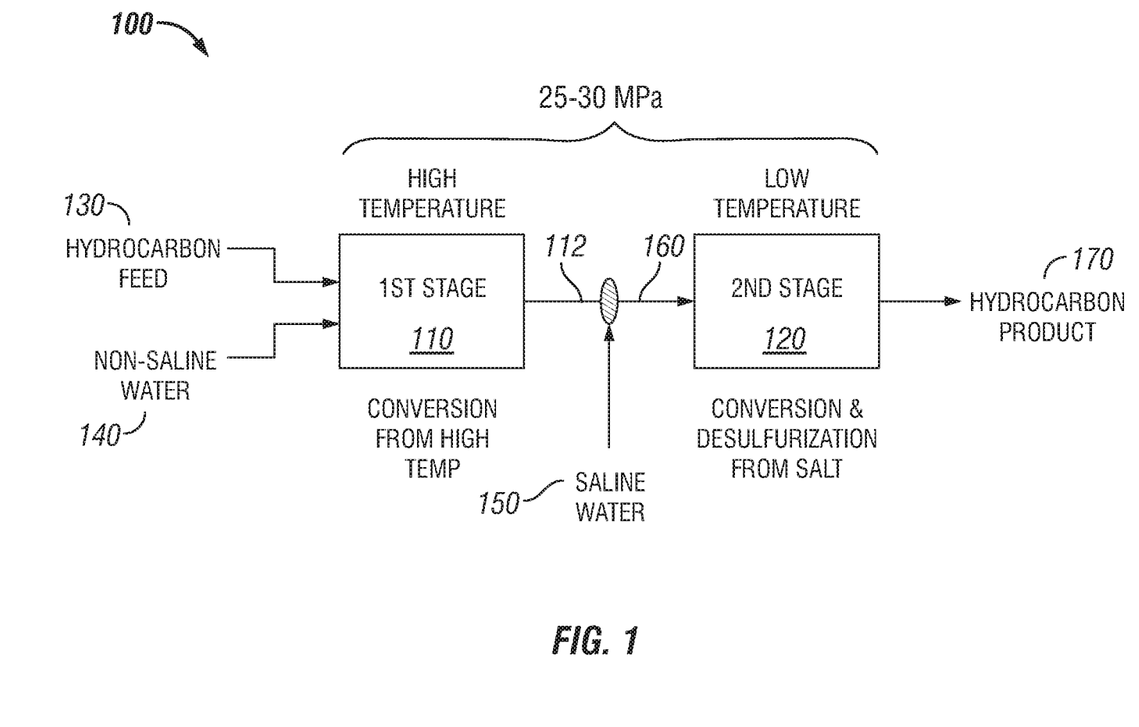
FIG. 1 is a schematic diagram of a process for upgrading heavy hydrocarbons according to an embodiment of the disclosure.

FIG. 1 shows a schematic diagram of a process 100 for upgrading heavy hydrocarbons. The process 100 can include a first stage reactor 110 and a second stage reactor 120.

A hydrocarbon feed 130 is introduced to the first stage reactor 110. A non-saline water feed 140 is introduced to the first stage reactor 110. The non-saline water feed 140 is substantially in the absence of the alkali/alkaline earth metal compounds. In some embodiments, the hydrocarbon feed 130 and the non-saline water feed 140 can be premixed before being introduced to the first stage reactor 110 using any type of mixing device capable of mixing the hydrocarbon feed 130 and the non-saline water feed 140, such as a tee junction, a static mixer, an inline mixer, and impeller-embedded mixer. In other embodiments, the hydrocarbon feed 130 and the non-saline water feed 140 are separately introduced to the first stage reactor 110. The hydrocarbon feed 130 and the non-saline water feed 140 are introduced to the first stage reactor 110 having a water-to-oil volume ratio ranging between about 0.1 and about 10 at SATP, alternately between about 0.2 and about 5 at SATP, or alternately between about 0.5 and about 2 at SATP. In at least one embodiment, the water-to-oil volume ratio is about 1.8.

Optionally, the hydrocarbon feed 130 can be preheated using a heat exchanger (not shown) to a temperature ranging between about 50 deg. C. and about 350 deg. C., alternately between about 70 deg. C. and about 250 deg. C., or alternately between about 90 deg. C. and about 150 deg. C. The heat exchanger can be any type of heat exchanger capable of increasing the temperature of the hydrocarbon feed 130. Non-limiting examples of the heat exchanger can include an electric heater, a fired heater, and a cross exchanger.

Optionally, the non-saline water feed 140 can be preheated using a heat exchanger (not shown) to a temperature ranging between 380 deg. C. and about 600 deg. C. or alternately between about 400 deg. C. and about 550 deg. C. The heat exchanger can be any type of heat exchanger capable of increasing the temperature of the non-saline water feed 140. Non-limiting examples of the heat exchanger can include an electric heater, a fired heater, and a cross exchanger.

The first stage reactor 110 is maintained at a temperature and pressure such that the water is in its supercritical state. The first stage reactor 110 can be maintained at a temperature ranging between about 425 deg. C. and about 500 deg. C. or alternately between about 425 deg. C. and about 460 deg. C. Means for maintaining such temperature of the first stage reactor 110 can include a strip heater, immersion heater, tubular furnace, heat exchanger, or like devices known in the art. The first stage reactor 110 can be maintained at a pressure ranging between about 25 MPa and about 30 MPa or alternately between about 27 MPa and about 30 MPa. In at least one embodiment, the first stage reactor 110 is maintained at a pressure of about 28.5 MPa. The first stage reactor 110 can be a tubular type reactor, a vessel type reactor, a continuous stirred-tank reactor (CSTR), and combinations of the same. In at least one embodiment, the first stage reactor 110 is a tubular type reactor. The first stage reactor can be an upflow reactor, a downflow reactor, and combinations of the same. The residence time in the first stage reactor 110 can range between about 10 seconds and about 60 min, alternately between about 0.5 min and about 30 min, or alternately between about 1 min and about 10 min. The residence time is calculated by assuming that the densities of the reactants in the first stage reactor 110 are similar to that of water at operating conditions of the first stage reactor 110. In at least one embodiment, the first stage reactor 110 is in the absence of an external supply of catalyst. In at least one embodiment, the first stage reactor 110 is in the absence of an external supply of hydrogen. The product of the first stage reactor 110 is collected via an effluent stream 112.

A saline water feed 150 is introduced to the process 100. The saline water feed 150 can have an alkali/alkaline earth metal compound content ranging between about 100 wt. ppm and about 6,000 wt. ppm or alternately between about 500 wt. ppm and about 3,000 wt. ppm. The saline water feed 150 is combined with the effluent stream 112 to produce a feed stream 160 using any type of mixing device such as a tee junction, a static mixer, an inline mixer, and impeller-embedded mixer. The saline water feed 150 is introduced to the process 100 having a saline-to-non-saline water volume ratio ranging between about 0.05 and about 1 at SATP or alternately between about 0.1 and about 0.5 at SATP. In at least one embodiment, the volume ratio between the saline water feed 150 and the non-saline water feed 140 is about 0.3. In some embodiments, the density of water in the saline water feed 150 ranges between about 150 kg/m$^3$ and about 250 kg/m$^3$.

Optionally, the saline water feed 150 can be preheated using a heat exchanger (not shown) to a temperature ranging between about 374 deg. C. and about 450 deg. C. or alternately between about 380 deg. C. and about 420 deg. C. The heat exchanger can be any type of heat exchanger capable of increasing the temperature of the saline water feed 150. Non-limiting examples of the heat exchanger can include an electric heater, a fired heater, and a cross exchanger.

The feed stream 160 is introduced to the second stage reactor 120. The second stage reactor 120 is maintained at a temperature and pressure such that the water is in its supercritical state. The temperature of the second stage reactor 120 is less than that of the first stage reactor 110 to obtain a greater solubility of the alkali/alkaline earth salt in supercritical water conditions. Without being bound by any theory, in supercritical water conditions, a reduced temperature corresponds to increased density, which positively correlates to the solubility of the alkali/alkaline earth salts. In addition, a reduced temperature in supercritical water conditions corresponds to a greater degree of catalyst-mediated reactions than non-catalytic thermal cracking. Although such reduced temperature may not be favored from a kinetic perspective, embodiments of the disclosure provide that the advantages obtained from having a greater degree of dissolved alkali/alkaline earth salts surpass the negative effect of reaction rate reduction. The alkali/alkaline earth metal compound content in the second stage reactor 120 can range between about 100 wt. ppm and about 2,000 wt. ppm or alternately between about 500 wt. ppm and about 1,000 wt. ppm. The alkali/alkaline earth metal compound content is less than the solubility limit at operating conditions of the second stage reactor 120. In some embodiments, the temperature of the second stage reactor 120 is about 5 deg. C. to about 100 deg. C. less than that of the first stage reactor 110. The second stage reactor 120 can be maintained at a temperature ranging between about 374 deg. C. and about 425 deg. C. or alternately between about 380 deg. C. and about 420 deg. C. Means for maintaining such temperature of the second stage reactor 120 can include a strip heater, immersion heater, tubular furnace, heat exchanger, or like devices known in the art. The pressure of the second stage reactor 120 can be similar to that of the first stage reactor 110. In some embodiments, the pressure difference between the first stage reactor 110 and the second stage reactor 120 is less than about 2 MPa or alternately less than about 0.2 MPa. The second stage reactor 120 can be maintained at a pressure ranging between about 25 MPa and about 30 MPa or alternately between about 27 MPa and about 30 MPa. In at least one embodiment, the second stage reactor 120 is maintained at a pressure of about 28.5 MPa. Due to the lesser temperature and similar pressure of the second stage reactor 120 in comparison with the first stage reactor 110, the density of water in the second stage reactor 120 is greater than that of water in the first stage reactor 110. In some embodiments, the density of water in the second stage reactor 120 ranges between about 150 kg/m$^3$ and about 250 kg/m$^3$. The second stage reactor 120 can be a tubular type reactor, a vessel type reactor, a CSTR, and combinations of the same. In at least one embodiment, the second stage reactor 120 is a tubular type reactor. The residence time in the second stage reactor 120 can range between about 5 min and about 30 min. The residence time is calculated by assuming that the densities of the reactants in the second stage reactor 120 are similar to that of water at operating conditions of the second stage reactor 120. In at least one embodiment, the second stage reactor 120 is in the absence of an external supply of catalyst other than alkali/alkaline earth metal salts. In at least one embodiment, the second stage reactor 120 is in the absence of an external supply of hydrogen. The product of the second stage reactor 120 is collected via a product stream 170. The product stream 170 includes upgraded hydrocarbons.

Optionally, the product stream 170 can be cooled to a temperature ranging between about 0 deg. C. and about 150 deg. C., alternately between about 50 deg. C. and about 120 deg. C., or alternately between about 70 deg. C. and about 100 deg. C. Optionally, the product stream 170 can be depressurized to a pressure ranging between about 0.01 MPa and about 10 MPa, alternately between about 0.05 MPa and about 5 MPa, or alternately between about 0.1 MPa and about 1 MPa. The optional cooling or depressurizing, or both, of the product stream 170 are conducted to prevent unwanted phase separation under near-critical water conditions of the product stream 170 egressing the second stage reactor. In some embodiments, the depressurizing of the product stream 170 is conducted in less than about 2 min or alternately less than about 0.5 min after components of the product stream 170 egress the second stage reactor 120.

Figure 2:
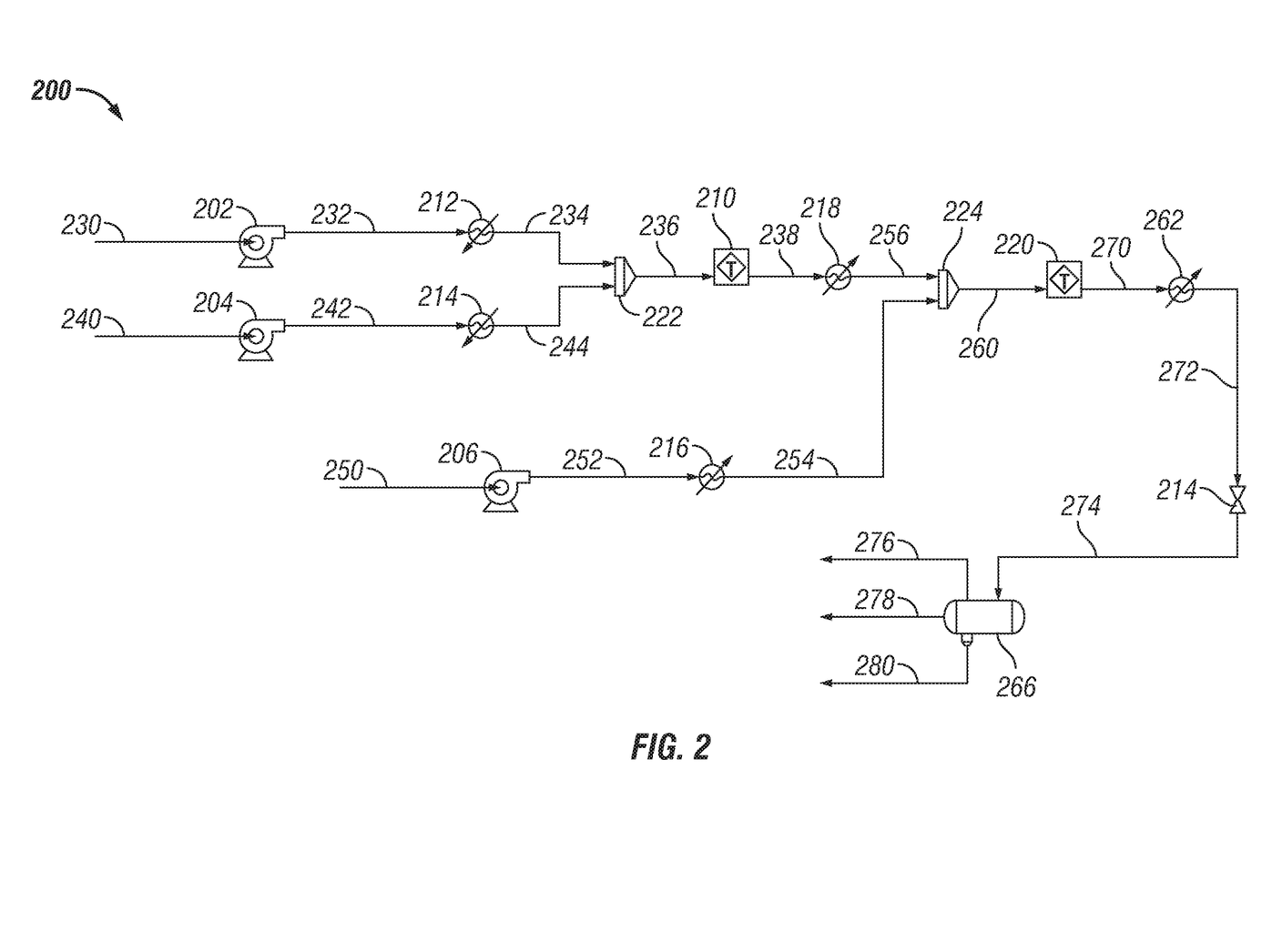
FIG. 2 is a schematic diagram of a process for upgrading heavy hydrocarbons according to an embodiment of the disclosure.

FIG. 2 shows a schematic diagrams of a process 200 for upgrading heavy hydrocarbons. The process 200 can include pumps 202, 204, 206, heat exchangers 212, 214, 216, 218, 262, mixers 222, 224, a first stage reactor 210, a second stage reactor 220, a pressure reducer 264, and a separator 266.

A hydrocarbon feed 230 is introduced to the process 200. The hydrocarbon feed 230 is passed to the pump 202. The pump 202 can be any type of pump capable of increasing the pressure of the hydrocarbon feed 230. In at least one embodiment, the pump 202 is a diaphragm metering pump. The pressure of the hydrocarbon feed 230 is increased in the pump 202 to produce a hydrocarbon stream 232. The pressure of the hydrocarbon stream 232 can range between about 25 MPa and about 30 MPa or alternately between about 27 MPa and about 30 MPa. In at least one embodiment, the pressure of the hydrocarbon stream 232 is about 28.5 MPa.

The hydrocarbon stream 232 is passed to the heat exchanger 212. The heat exchanger 212 can be any type of heat exchanger capable of increasing the temperature of the hydrocarbon stream 232. Non-limiting examples of the heat exchanger 212 can include an electric heater, a fired heater, and a cross exchanger. The temperature of the hydrocarbon stream 232 is increased in the heat exchanger 212 to produce a hydrocarbon stream 234. The temperature of the hydrocarbon stream 234 can range between about 50 deg. C. and about 350 deg. C., alternately between about 70 deg. C. and about 250 deg. C., or alternately between about 90 deg. C. and about 150 deg. C. In at least one embodiment, the temperature of the hydrocarbon stream 234 is about 170 deg. C.

A non-saline water feed 240 is introduced to the process 200. The non-saline water feed 240 is substantially in the absence of the alkali/alkaline earth metal compounds. The non-saline water feed 240 is passed to the pump 204. The pump 204 can be any type of pump capable of increasing the pressure of the non-saline water feed 240. In at least one embodiment, the pump 204 is a diaphragm metering pump. The pressure of the non-saline water feed 240 is increased in the pump 204 to produce a non-saline water stream 242. The pressure of the non-saline water stream 242 can range between about 25 MPa and about 30 MPa or alternately between about 27 MPa and about 30 MPa. In at least one embodiment, the pressure of the non-saline water stream 242 is about 28.5 MPa.

The non-saline water stream 242 is passed to the heat exchanger 214. The heat exchanger 214 can be any type of heat exchanger capable of increasing the temperature of the non-saline water stream 242. Non-limiting examples of the heat exchanger 214 can include an electric heater, a fired heater, and a cross exchanger. The temperature of the non-saline water stream 242 is increased in the heat exchanger 214 to produce a non-saline water stream 244. The temperature of the non-saline water stream 244 can range between about 380 deg. C. and about 600 deg. C. or alternately between about 400 deg. C. and about 550 deg. C. In at least one embodiment, the temperature of the non-saline water stream 244 is about 480 deg. C.

The hydrocarbon stream 234 and the non-saline water stream 244 are passed to the mixer 222 to produce a first mixed stream 236. The mixer 222 can be any type of mixing device capable of mixing the hydrocarbon stream 234 and the non-saline water stream 244. Non-limiting examples of mixing devices suitable for use as the mixer 222 can include a static mixer, an inline mixer, and impeller-embedded mixer.

The first mixed stream 236 is introduced to the first stage reactor 210. The first mixed stream 236 is introduced to the first stage reactor 910 having a water-to-oil mass flow ratio ranging between about 0.1 and about 10 at SATP, alternately between about 0.2 and about 5 at SATP, or alternately between about 0.5 and about 2 at SATP. In at least one embodiment, the water-to-oil mass flow ratio is about 1.8.

The first stage reactor 210 is maintained at a temperature and pressure such that the water is in its supercritical state. The first stage reactor 210 can be maintained at a temperature ranging between about 425 deg. C. and about 500 deg. C. or alternately between about 425 deg. C. and about 460 deg. C. Means for maintaining such temperature of the first stage reactor 110 can include a strip heater, immersion heater, tubular furnace, heat exchanger, or like devices known in the art. The first stage reactor 210 can be maintained at a pressure ranging between about 25 MPa and about 30 MPa or alternately between about 27 MPa and about 30 MPa. In at least one embodiment, the first stage reactor 210 is maintained at a pressure of about 28.5 MPa.

The first stage reactor 210 can be a tubular type reactor, a vessel type reactor, a CSTR, and combinations of the same. In at least one embodiment, the first stage reactor 210 is a tubular type reactor. The first stage reactor can be an upflow reactor, a downflow reactor, and combinations of the same. The residence time in the first stage reactor 210 can range between about 10 seconds and about 60 min, alternately between about 0.5 min and about 30 min, or alternately between about 1 min and about 10 min. The residence time is calculated by assuming that the densities of the reactants in the first stage reactor 210 are similar to that of water at operating conditions of the first stage reactor 210. In at least one embodiment, the first stage reactor 210 is in the absence of an external supply of catalyst. In at least one embodiment, the first stage reactor 210 is in the absence of an external supply of hydrogen. The product of the first stage reactor 210 is collected via an effluent stream 238.

The effluent stream 238 is passed to the heat exchanger 218. The heat exchanger 218 can be any type of heat exchange device capable of reducing the temperature of the effluent stream 238. Non-limiting examples of the heat exchanger 218 can include an air cooler, a double pipe type exchanger, and shell-and-tube type exchanger. The temperature of the effluent stream 238 is reduced in heat exchanger 218 to produce a cooled effluent stream 256. The temperature of the cooled effluent stream 256 can range between about 374 deg. C. and about 430 deg. C. or alternately between about 380 deg. C. and about 420 deg. C. In at least one embodiment, the temperature of the cooled effluent stream 256 is about 427 deg. C.

A saline water feed 250 is introduced to the process 200. The saline water feed 250 can have an alkali/alkaline earth metal compound content ranging between about 100 wt. ppm and about 6,000 wt. ppm or alternately between about 500 wt. ppm and about 3,000 wt. ppm. The saline water feed 250 is passed to the pump 206. The pump 206 can be any type of pump capable of increasing the pressure of the saline water feed 250. In at least one embodiment, the pump 206 is a diaphragm metering pump. The pressure of the saline water feed 250 is increased in the pump 206 to produce a saline water stream 252. The pressure of the saline water stream 252 can range between about 25 MPa and about 30 MPa or alternately between about 27 MPa and about 30 MPa. In at least one embodiment, the pressure of the saline water stream 252 is about 28.4 MPa.

The saline water stream 252 is passed to the heat exchanger 216. The heat exchanger 216 can be any type of heat exchanger capable of increasing the temperature of the saline water stream 252. Non-limiting examples of the heat exchanger 216 can include an electric heater, a fired heater, and a cross exchanger. The temperature of the saline water stream 252 is increased in the heat exchanger 216 to produce a saline water stream 254. The temperature of the saline water stream 254 can range between about 374 deg. C. and about 450 deg. C. or alternately between about 380 deg. C. and about 420 deg. C. In at least one embodiment, the temperature of the saline water stream 254 is about 395 deg. C. In some embodiments, the density of water in the saline water stream 254 ranges between about 150 kg/m$^3$ and about 250 kg/m$^3$.

The cooled effluent stream 256 and the saline water stream 254 are passed to the mixer 224 to produce a second mixed stream 260. The mixer 224 can be any type of mixing device capable of mixing the cooled effluent stream 256 and the saline water stream 254. Non-limiting examples of mixing devices suitable for use as the mixer 224 can include a static mixer, an inline mixer, and impeller-embedded mixer.

The second mixed stream 260 is introduced to the second stage reactor 220. The second mixed stream 260 is introduced to the second stage reactor 220 while maintaining a saline-to-non-saline water mass flow ratio ranging between about 0.05 and about 1 at SATP or alternately between about 0.1 and about 0.5 at SATP. In at least one embodiment, the mass flow ratio between the saline water feed 250 and the non-saline water feed 240 is about 0.3.

The second stage reactor 220 is maintained at a temperature and pressure such that the water is in its supercritical state. The temperature of the second stage reactor 220 is less than that of the first stage reactor 210 to obtain a greater solubility of the alkali/alkaline earth salt in supercritical water conditions. Without being bound by any theory, in supercritical water conditions, a reduced temperature corresponds to increased density, which positively correlates to the solubility of the alkali/alkaline earth salts. In addition, a reduced temperature in supercritical water conditions corresponds to a greater degree of catalyst-mediated reactions than non-catalytic thermal cracking. Although such reduced temperature may not be favored from a kinetic perspective, embodiments of the disclosure provide that the advantages obtained from having a greater degree of dissolved alkali/alkaline earth salts surpass the negative effect of reaction rate reduction. The alkali/alkaline earth metal compound content in the second stage reactor 220 can range between about 100 wt. ppm and about 2,000 wt. ppm or alternately between about 500 wt. ppm and about 1,000 wt. ppm. The alkali/alkaline earth metal compound content is less than the solubility limit at operating conditions of the second stage reactor 220. In some embodiments, the temperature of the second stage reactor 220 is about 5 deg. C. to about 100 deg. C. less than that of the first stage reactor 210. The second stage reactor 220 can be maintained at a temperature ranging between about 374 deg. C. and about 425 deg. C. or alternately between about 380 deg. C. and about 420 deg. C. Means for maintaining such temperature of the second stage reactor 220 can include a strip heater, immersion heater, tubular furnace, heat exchanger, or like devices known in the art. The pressure of the second stage reactor 220 can be similar to that of the first stage reactor 210. In some embodiments, the pressure difference between the first stage reactor 210 and the second stage reactor 220 is less than about 2 MPa or alternately less than about 0.2 MPa. The second stage reactor 220 can be maintained at a pressure ranging between about 25 MPa and about 30 MPa or alternately between about 27 MPa and about 30 MPa. In at least one embodiment, the second stage reactor 220 is maintained at a pressure of about 28.4 MPa. Due to the lesser temperature and similar pressure of the second stage reactor 220 in comparison with the first stage reactor 210, the density of water in the second stage reactor 220 is greater than that of water in the first stage reactor 210. In some embodiments, the density of water in the second stage reactor 220 ranges between about 150 kg/m$^3$ and about 250 kg/m$^3$. The second stage reactor 220 can be a tubular type reactor, a vessel type reactor, a CSTR, and combinations of the same. In at least one embodiment, the second stage reactor 220 is a tubular type reactor. The residence time in the second stage reactor 220 can range between about 5 min and about 30 min. The residence time is calculated by assuming that the densities of the reactants in the second stage reactor 220 are similar to that of water at operating conditions of the second stage reactor 220. In at least one embodiment, the second stage reactor 220 is in the absence of an external supply of catalyst other than alkali/alkaline earth metal salts. In at least one embodiment, the second stage reactor 220 is in the absence of an external supply of hydrogen. The product of the second stage reactor 220 is collected via a product stream 270. The product stream 270 includes upgraded hydrocarbons.

The product stream 270 is passed to heat exchanger 262. The heat exchanger 262 can be any type of heat exchange device capable of reducing the temperature of the product stream 270. Non-limiting examples of the heat exchanger 262 can include a double pipe type exchanger and shell-and-tube type exchanger. The temperature of the product stream 270 is reduced in heat exchanger 262 to produce a cooled product stream 272. The temperature of the cooled product stream 272 can range between about 0 deg. C. and about 150 deg. C., alternately between about 50 deg. C. and about 120 deg. C., or alternately between about 70 deg. C. and about 100 deg. C. In at least one embodiment, the temperature of the cooled product stream 272 is about 75 deg. C.

The cooled product stream 272 is passed to the pressure reducer 264. The pressure reducer 264 can be any type of device capable of reducing the pressure of a fluid stream. Non-limiting examples of the pressure reducer 264 can include a pressure let-down valve, a pressure control valve, and a back pressure regulator. The pressure of the cooled product stream 272 is reduced in the pressure reducer 264 to produce a depressurized product stream 274. The pressure of the depressurized product stream 274 can range between about 0.01 MPa and about 10 MPa, alternately between about 0.05 MPa and about 5 MPa, or alternately between about 0.1 MPa and about 1 MPa. In at least one embodiment, the pressure of the depressurized product stream 274 is about 0.1 MPa. The depressurizing is conducted to prevent unwanted phase separation under near-critical water conditions of the product stream 270 egressing the second stage reactor 220. In some embodiments, the depressurizing is conducted in less than about 2 min or alternatively less than about 0.5 min after components of the product stream 270 egress the second stage reactor 220.

The depressurized product stream 274 is introduced to the separator 266. The separator 266 can be any type of separation device capable of separating a fluid stream into a gas phase hydrocarbon stream, a liquid phase hydrocarbon stream, and a spent water stream. In some embodiments, the separator 266 is a combination of a gas-liquid separator and an oil-water separator. The depressurized product stream 274 is separated by the separator 266 to produce a gas product stream 276, a liquid product stream 278, and a spent water stream 280. The gas product stream 276 includes gas phase hydrocarbons. The liquid product stream 278 includes liquid phase hydrocarbons. The alkali/alkaline earth salt is included in the spent water stream 280. The liquid product stream 278 includes trace quantities of the alkali/alkaline earth salt, which can be less than about 20 pkb.

Example

The disclosure is illustrated by the following examples, which are presented for illustrative purposes only, and are not intended as limiting the scope of the invention which is defined by the appended claims.

A process having a configuration similar to FIG. 2 was modelled using the HYSYS Hydroprocessing Model (Aspen Technology, Inc., Bedford Mass.). In reference to the properties of the stream for EXAMPLE, the description and stream numbers for FIG. 2 is used.

A hydrocarbon feed (stream 230) was introduced to the respective process at a mass flow rate of about 64.8 kilograms per hour (kg/hr) and a volume flow rate of about 10 barrels per day (bbl/d). The hydrocarbon feed was an atmospheric residue obtained from a crude distillation unit by feeding Arabian Light crude oil. The hydrocarbon feed had a composition as shown in Table 1. The pressure of the hydrocarbon feed was maintained at about 28.5 MPa (stream 232). The temperature of the hydrocarbon feed was maintained at about 170 deg. C. (stream 234).

TABLE 1

| API Gravity | 12.95 |
|---|---|
| Sulfur Content (wt. %) | 3.95 |
| Distillation Properties (deg. C.) | |
| TBP 5% | 376 |
| TBP 10% | 400 |
| TBP 30% | 462 |
| TBP 50% | 521 |
| TBP 70% | 585 |
| TBP 90% | 670 |
| TBP 95% | 702 |
| Viscosity at 50 deg. C. (centistokes or cSt) | 501 |
| Vanadium (wt. ppm) | 38.3 |

A non-saline water feed (stream 240) was introduced to the respective process at a mass flow rate of about 119.0 kg/h and a volume flow rate of about 18 bbl/d. The non-saline water was deionized water (ASTM Type I compliant) produced by a water purification system. The non-saline water had a conductivity of about 0.056 µS/cm. The non-saline water had a sodium content of less than about 1 µg/L. The pressure of the non-saline water feed was maintained at about 28.5 MPa (stream 242). The temperature of the non-saline water feed was maintained at about 480 deg. C. (stream 944).

The hydrocarbon feed and the non-saline water feed were combined to form a first mixed stream (stream 236). The pressure of the first mixed stream was maintained at about 28.5 MPa. The temperature of the first mixed stream was maintained at about 413 deg. C. The first mixed stream had a mass flow rate of about 183.8 kg/hr.

The first mixed stream was introduced to a first stage reactor (unit 210). The first stage reactor was a tubular type reactor. The first stage reactor was maintained in a manner such that the temperature and pressure of the resulting effluent stream (stream 238) was about 455 deg. C. and about 28.4 MPa, respectively. The effluent stream was cooled to a temperature of about 427 deg. C. (stream 256).

A saline water feed (stream 250) was introduced to the respective process at a mass flow rate of about 35.7 kg/hr and a volume flow rate of about 5.4 bbl/d. The saline water was prepared by adding sodium hydroxide to deionized water having a concentration of about 3,000 wt. ppm. The pressure of the saline water feed was maintained at about 28.4 MPa (stream 252). The temperature of the saline water feed was maintained at about 395 deg. C. (stream 254). In a comparative example, the saline water feed was replaced with a non-saline water feed in the absence of sodium hydroxide.

The effluent stream and the non-saline water feed were combined to form a second mixed stream (stream 260). The second mixed stream had an alkali metal compound content of about 693 wt. ppm. The pressure of the second mixed stream was maintained at about 28.4 MPa. The temperature of the second mixed stream was maintained at about 415 deg. C. The second mixed stream had a mass flow rate of about 219.6 kg/hr.

The first mixed stream was introduced to a second stage reactor (unit 220). The second stage reactor was a tubular type reactor. The second stage reactor was maintained in a manner such that the temperature and pressure of the resulting product stream (stream 270) was about 418 deg. C. and about 28.4 MPa, respectively. The product stream was cooled to a temperature of about 75 deg. C. (stream 272). The product stream was depressurized to a pressure of about 0.1 MPa (stream 274). The product stream was depressurized within 0.5 min after components of the product stream exited the second stage reactor.

The product stream was introduced to a separator (unit 266). The separator was a gas-liquid hydrocarbon-water separator. The product stream was separated into a gas product stream (stream 276), a liquid product stream (stream 278), and a spent water stream (stream 280).

The properties of the streams for EXAMPLE are provided in Table 2.

TABLE 2

| Stream No. | Temperature (deg. C.) | Pressure (MPa) | Mass Flow Rate (kg/h) |
|---|---|---|---|
| 230 | 50 | 0.1 | 64.8 |
| 232 | 55 | 28.5 | 64.8 |
| 234 | 170 | 28.5 | 64.8 |
| 240 | 25 | 0.0 | 119.0 |
| 242 | 27 | 28.5 | 119.0 |
| 244 | 480 | 28.5 | 119.0 |
| 236 | 413 | 28.5 | 183.8 |
| 238 | 455 | 28.4 | 183.8 |
| 256 | 427 | 28.4 | 183.8 |
| 250 | 25 | 0.0 | 35.7 |
| 252 | 27 | 28.4 | 35.7 |
| 254 | 395 | 28.4 | 35.7 |
| 260 | 415 | 28.4 | 219.6 |
| 270 | 418 | 28.4 | 219.6 |
| 272 | 75 | 26.5 | 219.6 |
| 274 | 74 | 0.1 | 219.6 |
| 276 | 47 | 0.1 | 2.1 |
| 278 | 47 | 0.1 | 63.0 |
| 280 | 47 | 0.1 | 154.4 |

The liquid product streams of had a composition as shown in Table 3.

TABLE 3

| | Product Oil | Comparative Example (no alkali/alkaline earth catalyst) |
|---|---|---|
| API Gravity | 16.5 | 15.9 |
| Sulfur Content (wt. %) | 2.84 | 3.36 |
| Distillation Properties (deg. C.) | | |
| TBP 5% | 230 | 285 |
| TBP 10% | 305 | 342 |
| TBP 30% | 407 | 428 |
| TBP 50% | 471 | 489 |
| TBP 70% | 541 | 558 |
| TBP 90% | 640 | 654 |
| TBP 95% | 683 | 694 |
| Viscosity at 50 deg. C. (cSt) | 46 | 152 |
| Vanadium (wt. ppm) | 16.8 | 32.5 |

The results show that the addition of the alkali/alkaline earth metal compound improved the upgrading of heavy oil. No plugging was observed when using the saline water.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used described in the disclosure are for organizational purposes only and are not meant to be used to limit the scope of the description.

What is claimed is:

1. A method for upgrading heavy hydrocarbons, the method comprising the steps of:
   introducing a heavy hydrocarbon feed and a non-saline water feed to a first stage reactor, wherein the heavy hydrocarbon feed comprises the heavy hydrocarbons, wherein the first stage reactor is operated at a pressure equal to or greater than 22.06 MPa and a temperature equal to or greater than 373.9 deg. C. to produce an effluent stream, wherein the effluent stream comprises a product from the first stage reactor;
   combining the effluent stream and a saline water feed to produce a feed stream, wherein the saline water feed comprises an alkali or alkaline earth metal compound, wherein the volume ratio of the saline water feed to the non-saline water feed is between 0.05 and 1, wherein the first stage reactor increases miscibility of the heavy hydrocarbons in the non-saline water, such that the heavy hydrocarbons have increased miscibility in the effluent stream; and
   introducing the feed stream to a second stage reactor, wherein the second stage reactor is operated at a pressure equal to or greater than 22.06 MPa and a temperature less than that of the first stage reactor but equal to or greater than 373.9 deg. C. to produce a product stream, wherein conversion reactions and desulfurization reactions take place in the second stage reactor, wherein the increased miscibility of the heavy hydrocarbons increases interaction between the alkali or alkaline earth metal compound in the saline water feed in the second stage reactor, wherein the product stream comprises upgraded hydrocarbons.

2. The method of claim 1, wherein the heavy hydrocarbons are selected from the group consisting of: an atmospheric residue fraction, a vacuum residue fraction, and combinations thereof.

3. The method of claim 1, wherein the non-saline water feed is substantially in the absence of the alkali or alkaline earth metal compound.

4. The method of claim 1, wherein the heavy hydrocarbon feed and the non-saline water feed are introduced to the first stage reactor having a water-to-oil volume flow ratio ranging between 0.5 and 2 at SATP.

5. The method of claim 1, wherein the first stage reactor is operated at a pressure ranging between 27 MPa and 30 MPa.

6. The method of claim 1, wherein the first stage reactor is operated at a temperature ranging between 425 deg. C. and 500 deg. C.

7. The method of claim 1, further comprising the step of:
   cooling the effluent stream to a temperature ranging between 380 deg. C. and 420 deg. C.

8. The method of claim 1, wherein the second stage reactor is operated at a pressure ranging between 27 MPa and 30 MPa.

9. The method of claim 1, wherein the second stage reactor is operated at a temperature ranging between 380 deg. C. and 420 deg. C.

10. The method of claim 1, wherein the alkali or alkaline earth metal compound is included in the saline water feed at a concentration ranging between 500 wt. ppm and 3,000 wt. ppm.

11. The method of claim 1, wherein the second stage reactor is operated such that water has a density ranging between 150 kg/m$^3$ and 250 kg/m$^3$.

12. The method of claim 1, wherein the second stage reactor is operated such that the alkali or alkaline earth metal compound is included in water at a concentration ranging between 500 wt. ppm and 1,000 wt. ppm.

13. The method of claim 1, further comprising the step of:
   cooling the product stream to a temperature ranging between 50 deg. C. and 120 deg. C.

14. The method of claim 1, further comprising the step of:
   depressurizing the product stream to a pressure ranging between 0.05 MPa and 5 MPa.

15. The method of claim 14, wherein the depressurizing step is conducted within 2 minutes after components of the product stream egress the second stage reactor.

16. The method of claim 1, further comprising the step of:
   introducing the product stream to a separator to produce a gas product stream, a liquid product stream, and a spent water stream, wherein the gas product stream comprises gaseous hydrocarbons, wherein the liquid product stream comprises liquid hydrocarbons.

17. The method of claim 16, wherein the spent water stream comprises the alkali or alkaline earth metal compound.

* * * * *